July 25, 1933.  O. E. PEASE ET AL  1,920,130
CLAMPING DEVICE
Filed March 16, 1929
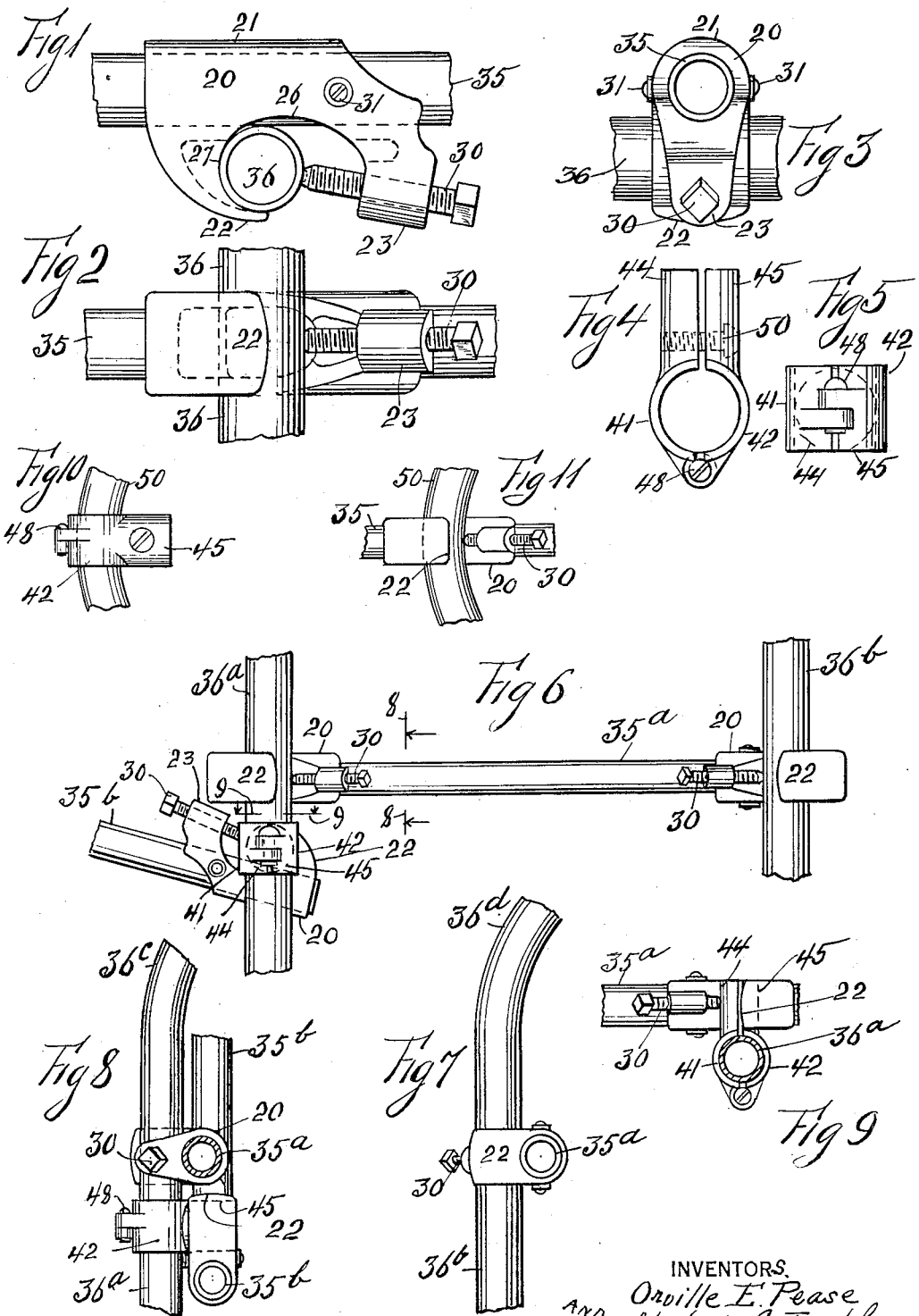
INVENTORS.
Orville E. Pease
AND Norbert G. Joseph
By A. A. de Bonneville
ATTORNEY Patented July 25, 1933

1,920,130

UNITED STATES PATENT OFFICE

ORVILLE E. PEASE, OF BALDWIN, NEW YORK, AND NORBERT G. JOSEPH, OF BOGOTA, NEW JERSEY, ASSIGNORS TO F. J. KLOES, INCORPORATED, OF NEW YORK, N. Y., A CORPORATION OF NEW YORK

CLAMPING DEVICE

Application filed March 16, 1929. Serial No. 347,588.

This invention relates to clamping devices.

The object of the invention is the production of clamping devices, by means of which pipes, rods, cables, ropes and the like can be easily and tightly clamped together. The second object of the invention is the production of devices, by means of which pipes, rods and the like located at right angles to each other can be clamped together. The third object of the invention is the production of devices by means of which pipes, rods, and the like having their longitudinal axes inclined to each other can be clamped together. The fourth object of the invention is the production of clamping devices by means of which the pipes, rods and the like of knock down structures, such as canopies and scaffolds, can be easily assembled, or dismantled.

In the accompanying drawing Fig. 1 represents a top plan view of an exemplification of a main clamping bracket of the device; Fig. 2 shows a bottom view of Fig. 1; Fig. 3 is a right hand end view of Fig. 1; Fig. 4 represents a top plan view of a supplemental clamping bracket; Fig. 5 shows an end view of the supplemental clamping bracket; Fig. 6 represents a side elevation of an assembly of pipes and clamping brackets for a canopy; Fig. 7 shows a right hand side view of a portion of Fig. 6; Fig. 8 shows a section of Fig. 6 on the line 8, 8; Fig. 9 is a section of Fig. 6 on the line 9, 9; Fig. 10 shows a view on a reduced scale, similar to Fig. 4, of the supplemental clamping bracket clamping a curved pipe and Fig. 11 shows a view similar to Fig. 2 on a reduced scale of the main clamping bracket clamping a curved pipe.

Referring to Figs. 1, 2 and 3 the main clamping bracket of the device in this instance comprises the barrel 20 having the outer circumferential surface 21. From one end of barrel 20 extends the clamping hook 22, and from its other end extends the internally threaded boss 23. The barrel 20 is cut away to form an opening 26 in its wall and which joins with the curved edge 27 of the hook 22. A clamping screw 30 having its longitudinal axis inclined to the longitudinal axis of the barrel 20 is in threaded engagement with the internal thread of the boss 23. A pair of screws 31 are in threaded engagement with the barrel 20. A pipe 35 is located in the opening of the barrel 20 and a second pipe 36 at right angles to the pipe 35 bears on the latter and on the inner curved edge 27 of the hook 22. One end of the clamping screw 30 bears against the pipe 36, and thereby both the pipes 35 and 36 are securely and detachably clamped in place. The screws 31 are used to hold the main clamping bracket having the barrel 20 in position on the pipe 35 during the assembling of a structure like a canopy or scaffold and before the pipe 36 is clamped in position.

Referring to Figs. 4 and 5 the supplemental clamping bracket consists of the barrel having the hinged members 41 and 42, and from the latter extend the plug members 44 and 45, somewhat spaced from each other in their closed position. A hinge pin 48 connects the hinged members 41 and 42, and a clamping screw 50 connects the plug members 44 and 45.

Referring to Figs. 6, 7, 8 and 9 a fragmentary portion of a canopy is indicated with the clamping brackets connected thereto. A pair of pipes 36ª and 36ᵇ similar to 36 constitutes the posts of the canopy. A horizontal member of the canopy is indicated by the pipe 35ª, similar to 35. A pair of the main clamping brackets oppositely positioned connect the horizontal member 35ª and the posts 36ª and 36ᵇ. The post 36ª forms a bow 36ᶜ at its upper portion and the post 36ᵇ forms a bow 36ᵈ at its upper portion. Each of the main clamping brackets for the canopy consists of the barrel 20, the hook 22, the clamping screw 30 and its other appurtenances as already described.

The post 36ª has connected thereto below its main clamping bracket, one of the supplemental clamping brackets indicated with its barrel having the hinged members 41, 42, the plug members 44, 45, the hinge pin 48 and other appurtenances as already described. To the plug members 44 and 45 is clamped one of the main clamping brackets shown with its barrel 20, the clamping hook 22, the boss 23, the clamping screw 30 and other appurtenances already described. A pipe 35$^b$ similar to 35 is clamped to the barrel 20 of the latter main clamping bracket and its longitudinal axis is inclined to the pipe 35$^a$ as clearly shown in Fig. 6. The inclination of the pipe 35$^b$ is obtained by clamping the lower main clamping bracket on plug members 44, 45 which extend from the post 36$^a$, so that said lower main clamping bracket will be positioned with the longitudinal axis of its barrel 20 in an inclined position relatively to the post 36$^a$ and the horizontal member or pipe 35$^a$.

Referring to Fig. 10 a curved pipe is indicated at 50 which has clamped thereto one of the supplemental clamping brackets with its hinged member 42, the hinge pin 48, the plug member 45 and other appurtenances as already described.

Referring to Fig. 11, the curved pipe 50 has clamped thereto the main clamping bracket, indicated with its barrel 20, the hook 22, the clamping screw 30 and its other appurtenances as already described. The pipe 35 is supported in the barrel 20.

Various modifications may be made in the invention and the present exemplification is to be taken as illustrative and not limitative thereof.

Having described our invention what we desire to secure by Letters Patent and claim is:

1. The combination in a clamping bracket of a barrel having an opening in the wall, said barrel adapted to support a pipe, a clamping hook extending from the barrel, said hook adapted to support a second pipe at right angles to the first pipe, the second pipe located over the opening in said barrel and bearing on the first pipe, an internally threaded boss extending from the barrel and a clamping screw with its longitudinal axis inclined to the longitudinal axis of the barrel in threaded engagement with said boss and one of its ends adapted to bear against said second pipe to clamp both of said pipes to said clamping bracket.

2. The combination of a main clamping bracket, comprising a barrel having an opening formed in its wall, a hook extending from the barrel, said barrel adapted to support a pipe, a supplemental clamping bracket functioning with the main clamping bracket, the supplemental clamping bracket comprising a pair of hinged members, a plug member extending from each hinged member, said hinged members adapted to support and clamp a second pipe, said plug members located under the hook of the main clamping bracket and bearing on said first pipe and a clamping screw in the main clamping bracket adapted to clamp said plug members in various angular positions, and thereby locate the first pipe with its longitudinal axis inclined in various angles to the longitudinal axis of the second pipe.

ORVILLE E. PEASE.
NORBERT G. JOSEPH.